United States Patent
Parthasarathy

(10) Patent No.: US 6,671,799 B1
(45) Date of Patent: Dec. 30, 2003

(54) SYSTEM AND METHOD FOR DYNAMICALLY SIZING HARDWARE LOOPS AND EXECUTING NESTED LOOPS IN A DIGITAL SIGNAL PROCESSOR

(75) Inventor: Sivagnanam Parthasarathy, Carlsbad, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 640 days.

(21) Appl. No.: 09/653,494

(22) Filed: Aug. 31, 2000

(51) Int. Cl.[7] .............. G06F 9/40; G06F 9/54; G06F 9/305
(52) U.S. Cl. ............ 712/241; 712/230; 712/231; 712/245; 712/35; 712/36
(58) Field of Search ................. 712/241, 230, 712/231, 245, 35, 36

(56) References Cited

U.S. PATENT DOCUMENTS

| | | | |
|---|---|---|---|
| 5,442,757 A | 8/1995 | McFarland et al. | 712/218 |
| 5,550,988 A | 8/1996 | Sarangdhar et al. | 711/113 |
| 5,560,032 A | 9/1996 | Nguyen et al. | 712/218 |
| 5,606,670 A | 2/1997 | Abramson et al. | 711/154 |
| 5,625,789 A | 4/1997 | Hesson et al. | 712/217 |
| 5,627,983 A | 5/1997 | Popescu et al. | 712/217 |
| 5,627,985 A | 5/1997 | Fetterman et al. | 712/217 |
| 5,630,157 A | 5/1997 | Dwyer, III | 712/214 |
| 5,644,753 A | 7/1997 | Ebrahim et al. | 711/131 |
| 5,644,759 A | 7/1997 | Lucas et al. | 712/240 |
| 5,710,913 A * | 1/1998 | Gupta et al. | 712/241 |
| 5,734,880 A * | 3/1998 | Guttag et al. | 712/241 |
| 5,748,934 A | 5/1998 | Lesartre et al. | 712/216 |

* cited by examiner

*Primary Examiner*—Daniel H. Pan
(74) *Attorney, Agent, or Firm*—Lisa K. Jorgenson; William A. Munck

(57) ABSTRACT

There is disclosed, for use in a digital signal processor, an apparatus for dynamically sizing a hardware loop that executes a plurality of instruction sequences forming a plurality of instruction loops. The apparatus comprises: 1) N pairs of loop start registers and loop end registers, each loop start register for storing a loop start address and each loop end register for storing a loop end address; 2) N comparators, each of the N comparators associated with one of the N pairs of loop start registers and loop end registers, wherein each of the N comparators compares a selected one of a first loop start address and a first loop end address to a fetch program counter value to detect one of a loop start hit and a loop end hit; and 3) fetch address generation circuitry for detecting the loop start hit and the loop end hit and fetching from an address in a program memory an instruction associated with one of the loop start hit and the loop end hit and loading the fetched instruction into the hardware loop.

21 Claims, 4 Drawing Sheets

SYSTEM AND METHOD FOR DYNAMICALLY SIZING HARDWARE LOOPS AND EXECUTING NESTED LOOPS IN A DIGITAL SIGNAL PROCESSOR

TECHNICAL FIELD OF THE INVENTION

The present invention is directed, in general, to digital signal processors (DSPs) and, more specifically, to a method and apparatus for controlling hardware loops in a DSP.

BACKGROUND OF THE INVENTION

The availability of high-speed data communications is creating greater demand for ever-faster digital signal processors (DSPs). Digital signal processors are used in mobile phones, cordless phones, wireless personal digital assistant (PDA) devices, local area network (LAN) cards, cable modems, and a host of radio frequency (RF) communication devices, including conventional and high-definition television (HDTV) sets and radio receivers. A number of different approaches have been taken to decrease instruction execution time, thereby increasing DSP throughput.

Many digital signal processors use one or more hardware loops to execute a sequence of instructions. A hardware loop provides true "zero overhead" loops of instructions in that no initialization instructions are needed for the loop and no dedicated branch instruction at the end of the loop are needed to branching back to the start of the loop. In a typical design, a digital signal processor (DSP) may implement, for example, three fully nested hardware loops. The DSP hardware loop architecture may comprise:

(a) three loop start registers (LSR0, LSR1, LSR2);
(b) three loop end registers (LER0, LER1, LER2);
(c) three loop count registers (LCR0, LCR1, LCR2); and
(d) three loop counter reload registers (RLD0, RLD1, RLD2).

In addition to the hardware loop architecture, a DSP may comprise a sixteen (16) instruction loop buffer capable of holding short loops. The DSP uses the loop buffer to feed instructions to the decode stage and to avoid memory fetches, as long as the loop is fully contained in the loop buffer.

A conventional digital signal processor that implements a hardware loop for executing nested loops of instructions is described in U.S. Pat. No. 5,710,913 to Gupto et al. The teachings of U.S. Pat. No. 5,710,913 are hereby incorporated by reference into the present- disclosure as if fully set forth herein.

Unfortunately, the circuitry used for determining when to fill and when to evict the loop buffer is quite complex. Adding to this complexity is a DSP architecture capable of executing multiple instruction sets of varying instruction sizes with minimal switching overhead. Hardware loops can be formed with any of the supported instruction sets. This increases the size of the integrated circuit (IC) and increases the overall power consumption of the DSP. Also, the DSP may use six (6) address comparators to compare the fetch address against the loop start registers and the loop end registers. These comparators also increase IC size and power consumption.

Therefore, there is a need in the art for improved digital signal processors that use more efficient hardware instruction loops. In particular, there is a need for DSP hardware loop architectures that minimize the amount of circuit space and energy used by the hardware loop(s). More particularly, there is a need for DSP hardware loop architecture that reduces the complexity of the loop buffer management circuitry and that reduces the number of comparator circuits required to compare the fetch address to the loop start registers and the loop end registers.

SUMMARY OF THE INVENTION

To address the above-discussed deficiencies of the prior art, it is a primary object of the present invention to provide, for use in a digital signal processor comprising an instruction fetch stage, a decode stage, a dispatch stage, and an execute stage, an apparatus for dynamically sizing a hardware loop capable of executing a plurality of instruction sequences forming a plurality of instruction loops. According to an advantageous embodiment of the present invention, the apparatus comprises: 1) N pairs of loop start registers and loop end registers, each loop start register capable of storing a loop start address and each loop end register capable of storing a loop end address; 2) N comparators, each of the N comparators associated with one of the N pairs of loop start registers and loop end registers, wherein each of the N comparators is capable of comparing a selected one of a first loop start address and a first loop end address to a fetch program counter value to detect one of a loop start hit and a loop end hit; and 3) fetch address generation circuitry capable of detecting the loop start hit and the loop end hit and fetching from an address in a program memory an instruction associated with one of the loop start hit and the loop end hit and loading the fetched instruction into the hardware loop.

According to one embodiment of the present invention, the apparatus for dynamically sizing a hardware loop as set forth in claim 1 wherein the N pairs of loop start registers and loop end registers comprise three pairs of loop start registers and loop end registers.

According to another embodiment of the present invention, the three pairs of loop start registers and loop end registers comprise a first loop start register and a first loop end register associated with a first instruction loop, a second loop start register and a second loop end register associated with a second instruction loop, and a third loop start register and a third loop end register associated with a third instruction loop.

According to still another embodiment of the present invention, the apparatus for dynamically sizing a hardware loop further comprises a loop buffer having a loop buffer size M capable of storing M instructions.

According to yet another embodiment of the present invention, the apparatus for dynamically sizing a hardware loop further comprises a loop buffer comparator capable of comparing the loop buffer size M to a difference between a first loop start address and a first loop end address to determine if a selected instruction loop associated with the first loop start address and the first loop end address is capable of fitting in the loop buffer.

According to a further embodiment of the present invention, the loop buffer comparator performs the comparison whenever one of the loop start registers and the loop end registers is updated.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do-not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 6, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged digital signal processor (DSP).

Figure 1A:
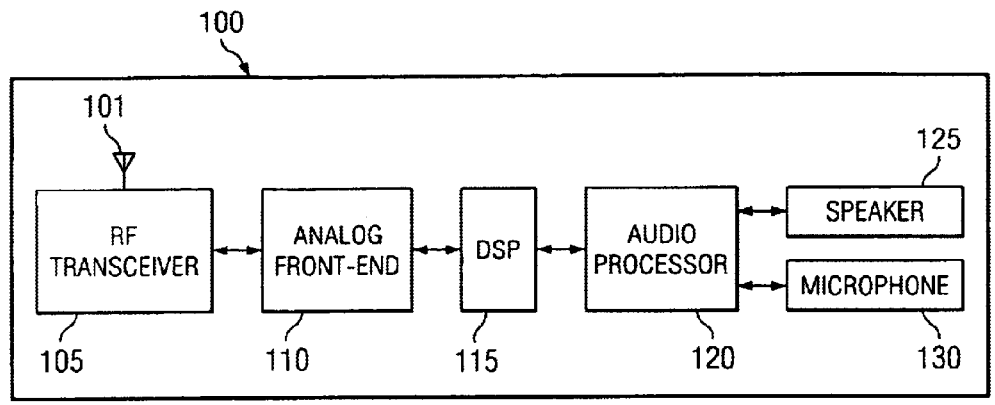
FIG. 1A illustrates an exemplary mobile phone containing a digital signal processor in accordance with the principles of the present invention.

FIG. 1A illustrates exemplary mobile phone 100 containing digital signal processor 115 in accordance with the principles of the present invention. Mobile phone 100 comprises antenna 101, radio frequency (RF) transceiver (X-CVR) 105, analog front-end circuitry 110, digital signal processor 115, audio processor. 120, speaker (SPKR) 125, and microphone (MIC) 130. In the inbound (or receive) signal path, RF transceiver 105 contains circuitry, such as a low noise amplifier (LNA) and an RF mixer, that amplifies an incoming RF signal detected by antenna 101 and down-converts the amplified RF signal to, for example, an intermediate frequency (IF) signal. Analog front-end circuitry 110 filters and further down-converts the IF signal to produce a digital input data stream that is input to digital signal processor (DSP) 115. DSP 115 performs any necessary decoding of the digital input data stream and outputs an analog baseband signal that is transmitted to audio processor 120. Audio processor 120 filters and amplifies the analog baseband signal to generate an audio signal that drives speaker 125.

In the outbound (or transmit) signal path, audio processor. amplifies and filters a voice signal detected by microphone 130. DSP 115 digitizes and encodes the outbound baseband analog signal generated by audio processor 120 to produce an outbound digital baseband signal. Analog front-end circuitry 160 then amplifies and up-converts the outbound digital baseband signal to produce an outbound IF signal. The IF signal is then up-converted to an output RF signal by RF transceiver 105. RF transceiver 105 then amplifies the output RF signal to an appropriate level to drive antenna 101.

Figure 1B:
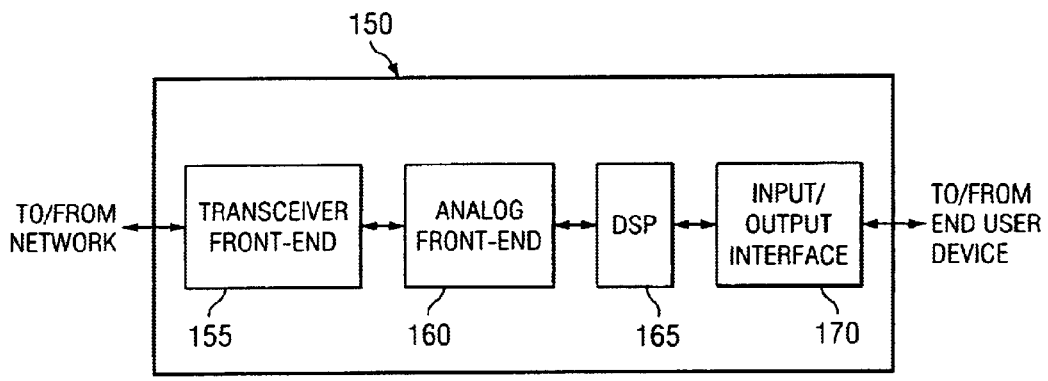
FIG. 1B illustrates an exemplary wireline communication device containing a digital signal processor in accordance with the principles of the present invention.

FIG. 1B illustrates exemplary wireline communication device 150 containing digital signal processor 165 in accordance with the principles of the present invention. Wireline communication device 150 may be a standard V.90 (i.e., 56K) modem, a cable modem, a 10Base-T, 100Base-T, or 1000Base-T local area network (LAN) card, a digital subscriber line (DSL) card, or the like. Wireline communication device 150 comprises transceiver (X-CVR) front-end circuitry 155, analog front-end circuitry 160, digital signal processor 165, and input-output (IF) interface circuitry 170. In the inbound (or receive) signal path, transceiver front-end circuitry 155 contains circuitry that amplifies an incoming signal received from an external communication line, such as a television cable, a phone line or a local area network wire. The incoming signal is a high-frequency modulated signal, including perhaps an RF signal, and down-converts the modulated signal to, for example, an intermediate frequency (IF) signal Analog front-end circuitry 160 filters out the frequencies of interest and further down-converts the IF signal to produce a digital input data stream that is input to digital signal processor (DSP) 165. DSP 165 performs any necessary decoding of the digital input data stream and outputs a digital baseband signal that is transmitted to I/O interface circuitry 170. I/O interface circuitry 170 buffers the digital baseband signal and transmits the received digital data to a connected end-user device (e.g., personal computer (PC), cable converter set-top box, network device).

In the outbound (or transmit) signal path, I/O interface circuitry 170 receives and buffers outbound baseband digital data from the end-user device. I/O interface circuitry 170 transmits the outbound baseband digital data to DSP 115, which encodes the outbound baseband analog signal to produce an outbound digital data stream. Analog front-end circuitry 160 then amplifies and up-converts the outbound digital data stream to produce an outbound IF signal. Transceiver front-end-circuitry 155 receives the IF signal and further up-converts it to produce a modulated output high-frequency signal.

According to an advantageous embodiment of the present invention, DSP 115 and DSP 165 are super-scalar DSP architectures that have more than one instruction pipeline. In the embodiments described below in FIGS. 2 through 6, it will be assumed that DSP 115 and DSP 165 contain two instruction pipelines, namely a data (D) instruction pipeline and a hybrid (H) instruction pipeline. DSP 115 and DSP 165 also comprise hardware instruction execution loop architectures according to the principles of the present invention. Since DSP 115 and DSP 165 are functionally equivalent, in order to avoid redundant description, only DSP 115 will be described hereafter.

In an exemplary embodiment of the present invention, loop start registers and loop end registers reside in the fetch stage. Every time these registers are updated, the fetch stage is notified. The fetch stage computes the difference between the corresponding loop end and loop start to determine the actual loop size. The fetch stage also determines whether the difference is less than or equal to the loop buffer size. The loop counter registers are updated in the execute stage. Status information concerning whether the loop counter register is updated to a zero value is sent to the fetch stage. This is required to skip the loop when the loop count is zero.

The fetch stage compares the fetch PC (program counter) value to the contents of all three loop addresses corresponding to the three loops. The decision whether to use loop start or loop end for the comparison against the fetch PC value is made based on whether the corresponding loop counter register is a zero value. Loop start is used when the loop count is zero for address comparison.

If there is a match between the fetch PC value and a loop end address, the fetch address generation circuitry is notified to use the corresponding loop start for the next fetch address. If the fetch PC value matches a loop start address, the fetch is stalled and status information is generated to indicate the loop start match. This-subsequently results in a flush of the instructions with the new fetch address as the corresponding loop end.

The present invention also accounts for the "corner" case wherein a loop counter is loaded with a value of zero and the subsequent instruction is the start of a loop. Since loop counters are updated several stages down the pipeline from the fetch stage, the fetch stage may use a loop end instead of a loop start to perform the address comparison. This would result in the body of a loop being executed once, which is an incorrect operation. To prevent this, the decode stage generates an additional micro-instruction every time a loop counter is loaded. This micro-instruction examines the result of the loop counter load and causes a flush to the next program counter (PC) value when the loop counter is zero. In effect, this cleans the pipeline and allows the hardware loop to detect the match with the loop start value the next time around.

Non-zero count loops are detected when the end of the loop is reached and, based on the corresponding loop size, a decision is made to lock the instructions in the loop buffer starting from the second iteration. In an exemplary embodiment of DSP 115 in which instructions, particularly branch instructions, are predicted, loop counters may be decremented in the dispatch stage.

Figure 2:
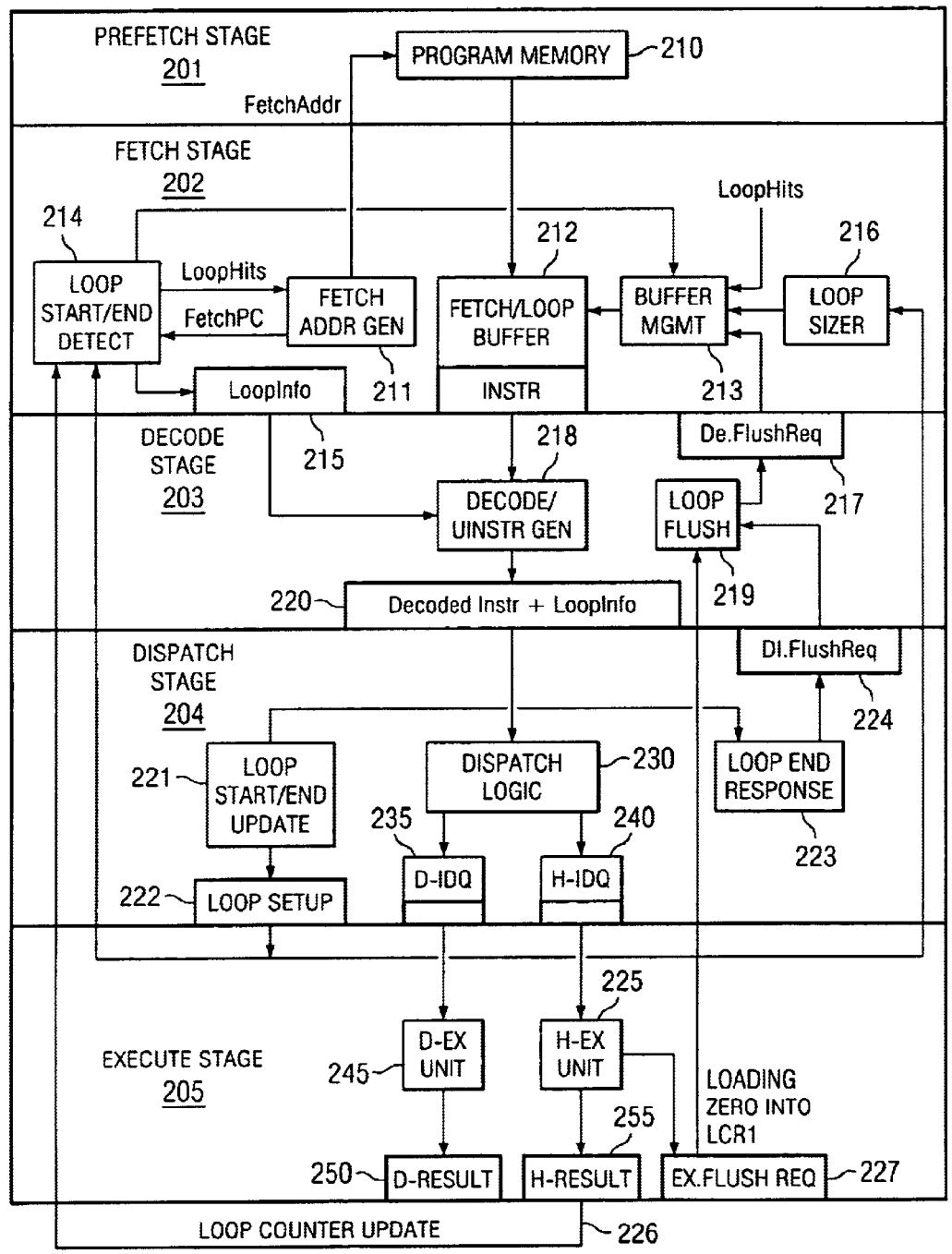
FIG. 2 is a functional level block diagram of an exemplary instruction pipeline in the digital signal processors in FIGS. 1A and 1B according to one embodiment of the present invention.

FIG. 2 is a functional level block diagram of an exemplary dual instruction pipeline in digital signal processors 115 and 165 in FIGS. 1A and 1B according to one embodiment of the present invention. FIG. 2 illustrates the five stages of the pipeline relevant to the present invention, namely prefetch stage 201, fetch stage 202, decode stage 203, dispatch stage 204 and execute stage 205. Prefetch stage 201 comprises program memory 210, which stores instructions and data that are sent into the dual instruction pipelines. Fetch stage 202 comprises fetch address generation circuitry 211, fetch/loop buffer 212, buffer management controller 213, loop start/end detection circuitry 214, loop information register 215, and loop sizer circuitry 216.

Decode stage 203 comprises decode flush request register 217, decode/micro-instruction generator 218, loop flush circuitry 219, and decode instruction and-loop information register 220. Dispatch stage 204 comprises loop start/end update circuitry 221, loop setup register 222, loop end response circuitry 223, dispatch flush request register 224, dispatch logic 230, data pipeline instruction data queue (D-IDQ) 235, and hybrid pipeline instruction data queue (H-IDQ) 240. Finally, execute stage 205 comprises data pipeline execution unit (D-Ex Unit) 245, hybrid pipeline execution unit (H-Ex Unit) 225, data pipeline result register 250, hybrid pipeline result register 255, and execute flush request register 227.

Instructions are fetched from program memory 210 according to the fetch address generated by fetch address generation circuitry 211. The fetched instructions are written into fetch/loop buffer 212 and directed to the appropriate buffer by buffer management controller 213. The fetch program counter (PC) value generated by fetch address generation circuitry 211 is sent to loop start/end detection circuitry 214 to determine if a loop "hit" has occurred. A hit occurs if the fetch PC value matches the start address or the end address of a loop. Loop hit information is registered in loop information register 215. Loop hit information is also sent to buffer management controller 213 in order to manage fetch/loop buffer 212.

If an update occurs to either the loop start value or the loop end value in loop start/end detection circuitry 214, loop sizer circuitry 216 dynamically determines the size of the loop and whether the loop can reside inside fetch/loop buffer 212. Flush requests from decode flush request register 217 redirect fetch address generation circuitry 211 and buffer management controller 213. Decode/micro-instruction generator 218 in decode stage 203 generates a special conditional branch instruction after a loop counter load instruction. This special conditional branch instruction generates a flush to the next PC value if the value loaded to the loop counter is a zero. This accounts for properly handling loops with a loop count or zero, which implies a skip of the entire loop.

Loop flush circuitry 219 collects flush requests from dispatch stage 204 and execute stage 205 and passes the flush requests to fetch stage 202. Decode stage 203 manages all flush requests including normal branch flushes. The output of decode stage 203 is registered in decode instruction and loop information register 220. This holds information on loop hits (i.e., whether the loop start value or loop end value were matched). The decoded instruction also indicates if a loop start register or loop end register is being loaded, along with the offset and the program counter (PC) value. This is used by loop start/end update circuitry 221 to compute the loop start/loop end value. The loop start/loop end value and the register number are stored in loop setup register 222.

Loop end response circuitry 223 recognizes loop hits from the loop information (LoopInfo) field, updates the appropriate loop counter, and generates a flush request, if needed. The flush request is registered in dispatch flush request register 224. Dispatch logic 230 sends the instructions to data pipeline instruction data queue (D-IDQ) 235 or hybrid pipeline instruction data queue (H-IDQ) 240.

Execute stage 205 handles all updates to loop counters in hybrid pipeline execution unit 225. These updates are registered and transmitted to fetch stage 202 via hybrid pipeline result register 255 as the signal Loop Counter Update (reference number 226). A conditional branch that checks whether the loop counter is loaded with a zero value also is sent to hybrid pipeline execution unit 225. In response to a loop counter zero load, an execute stage flush request is loaded into execute flush request register 227. The flush request is transmitted to loop flush circuitry 219 to cause a flush to the next PC address following the loop counter load.

Figure 3:
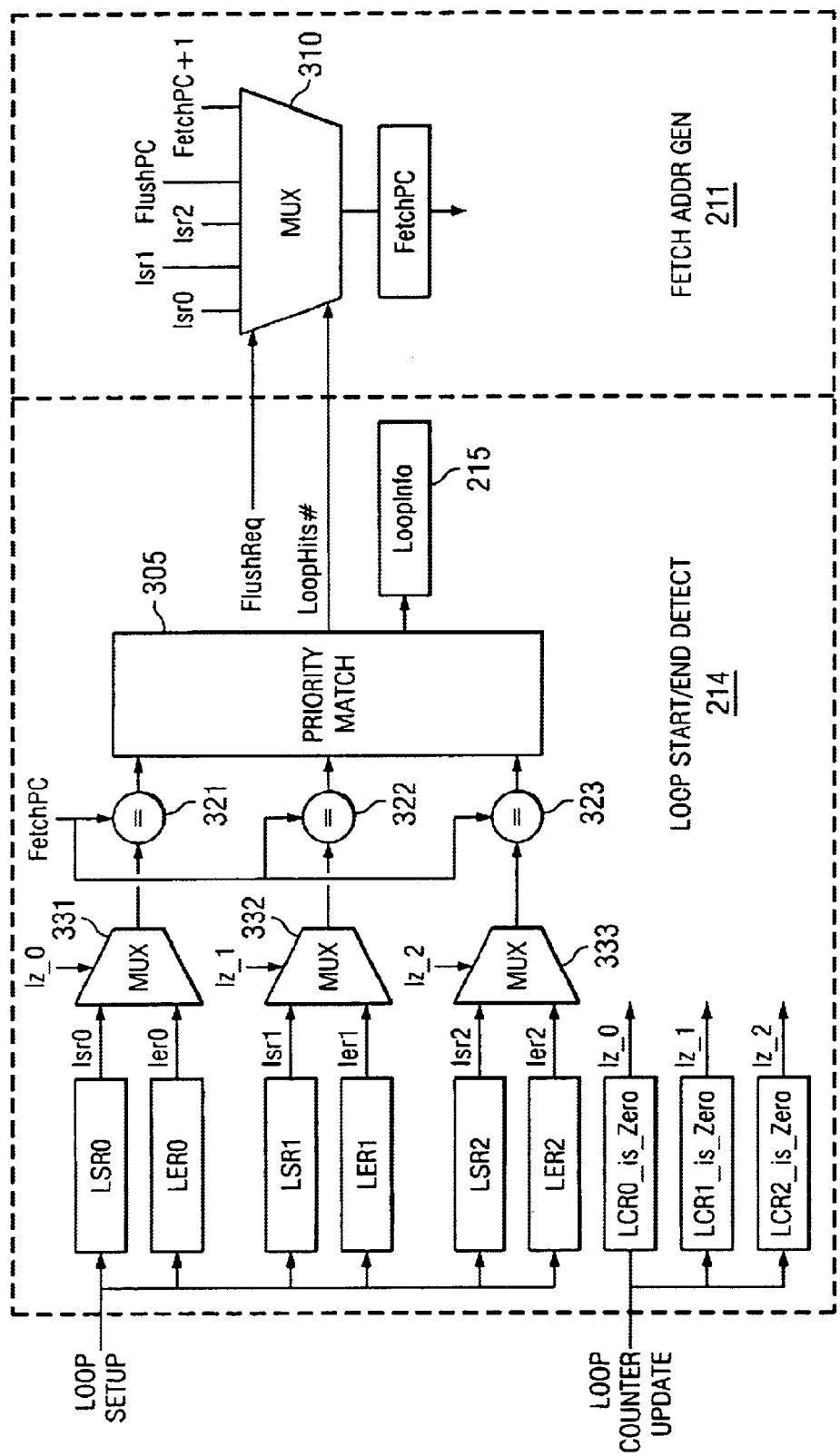
FIG. 3 is a more detailed block diagram of loop start/end detection circuitry and fetch address generation circuitry according to one embodiment of the present invention.

FIG. 3 is a more detailed block diagram of loop start/end detection circuitry 214 and fetch address generation circuitry 211 according to one embodiment of the present invention. Loop start/end detection circuitry 214 comprises the loop start registers, LSR0, LSR1, and LSR2, and the loop end registers, LER0, LER1, and LER2. Loop start/end detection circuitry 214 also comprises boolean logic blocks (i.e., LCR0_is_Zero, LCR1_is_Zero, LCR2_is_Zero) that indicate if the corresponding loop counter register contains a zero value. A zero value is indicated by the output signals lz_0, lz_1, and lz_2. If lz_0 is set, then LSR0 is selected. Otherwise, LER0 is chosen for comparison.

Comparisons are performed by transferring the loop start and loop end values stored in loop start registers, LSR0, LSR1, and LSR2, and the loop end registers, LER0, LER1, and LER2 through multiplexers 331–333 to comparators 321–323. The results of the comparison are transmitted to priority match circuitry 305. Priority match circuitry 305 resolves instances of multiple hits according to the convention that loops are always fully nested. The hit information and status information indicating whether loop start or loop end was matched is registered in loop information register 215. Loop hits generated by priority match circuitry 305 control multiplexer (MUX) 310 in order to generate the next fetch PC value. In case of a loop hit where the match is made to the loop end, the MUX control selects the corresponding loop start to restart the loop. A flush request from decode stage 203 overrides the MUX selection control for multiplexer 310.

The loop start registers (LSR0, LSR1, LSR2) and the loop end registers (LER0, LER1, LER2) can be updated in two ways: 1) from dispatch stage 204 when the updating instruction merely adds an immediate offset to the instruction PC value; and 2) from execute stage 205 when the instruction loads from memory into the loop register. The boolean logic blocks (LCR0_is_Zero, LCR1_is_Zero, LCR2_is_Zero) are updated from execute stage 205 whenever the loop counters are loaded either from a register or memory.

Figure 4:
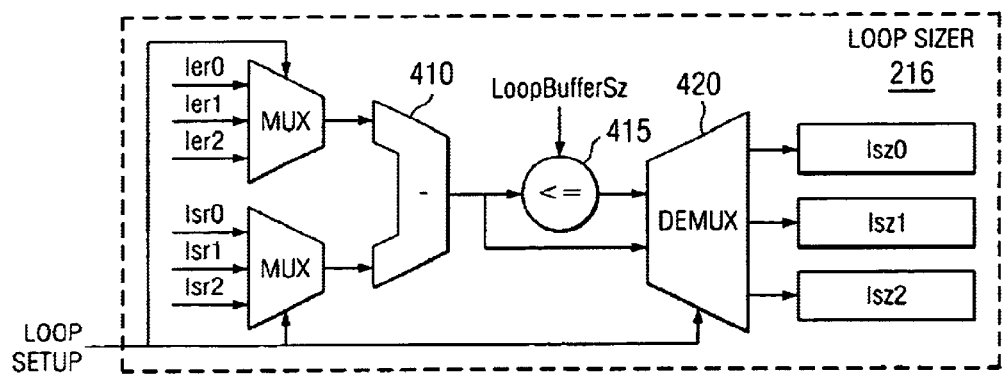
FIG. 4 is a more detailed block diagram of loop sizer circuitry according to one embodiment of the present invention.

FIG. 4 is a more detailed block diagram of loop sizer circuitry 216 according to one embodiment of the present invention. Loop sizer circuitry 216 determines loop size dynamically every time a loop start register or a loop end.register is written to from dispatch stage 204 or execute stage 205. Loop sizer circuitry 216 selects the loop pair (i.e., Loop Start, Loop End) that had one of its members updated and subtraction circuit 410 calculates the difference between Loop End and Loop Start as shown in FIG. 3. Logic circuit 415 then compares the difference value to a Loop Buffer size value to see if the loop size is less than or equal to the size of fetch/loop buffer 212.

This result, and the loop size are stored by demultiplexer 420 into the corresponding loop size register. There are three loop size registers (i.e., LSZ0, LSZ1, LSZ2) as indicated in FIG. 4. These loop size registers are used by buffer management controller 213 (shown in FIG. 5) to direct the instructions and to manage the multiplexer controls for fetch/loop buffer 212.

Figure 5:
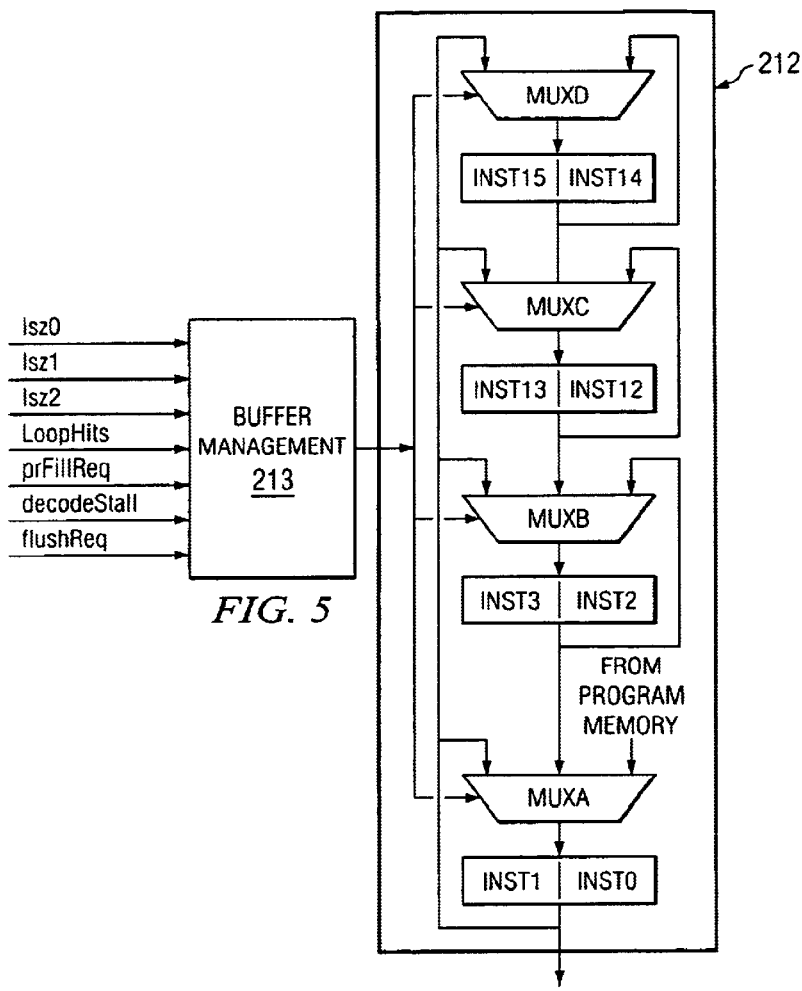
FIG. 5 is a more detailed block diagram of an exemplary loop buffer management controller and an exemplary fetch/loop buffer according to one embodiment of the present invention.

FIG. 5 is a more detailed block diagram of exemplary loop buffer management controller 213 and fetch/loop buffer 212 according to one embodiment of the present invention. Loop buffer management controller 213 is a state machine whose inputs include, the loop size registers, loop hit information from loop start/end detection circuitry 214, prefetch fill request (pfFillReq) from prefetch stage 201, a decode stall signal from decode stage 203, and a flush request signal from decode stage 203. Loop buffer management controller 213 uses these inputs to determine the MUX controls for fetch/loop buffer. 212. FIG. 5 illustrates a case where decode stage 203 receives two instructions from the bottom of fetch/loop buffer 212. Instructions from program memory 210 are always sent to the bottom of fetch/loop buffer 212. In the exemplary embodiment, fetch/loop buffer 212 is sixteen (16) instructions long. Instructions are stored in pairs of registers labeled Inst0 through Inst15. The size of the loop is dynamically changed by looping instructions from the output of registers Inst0 and Inst1 back through one of multiplexers labeled MUXA through MUXD into a previous pair of registers Inst2–Inst15. Fetch/loop buffer 212 eliminates program memory 210 access penalty. Since several DSP algorithms can be coded in small loops, this can provide enormous benefit in terms of power and speed.

Decode stage 203, upon detection of a loop counter load instruction, injects a conditional branch to check if the loaded loop counter is a zero and requests a flush to the PC following the loop counter load. As noted above, this accounts for "corner" cases where the loop counter is a zero and it is necessary to match the loop start address instead of the loop end address.

Figure 6:
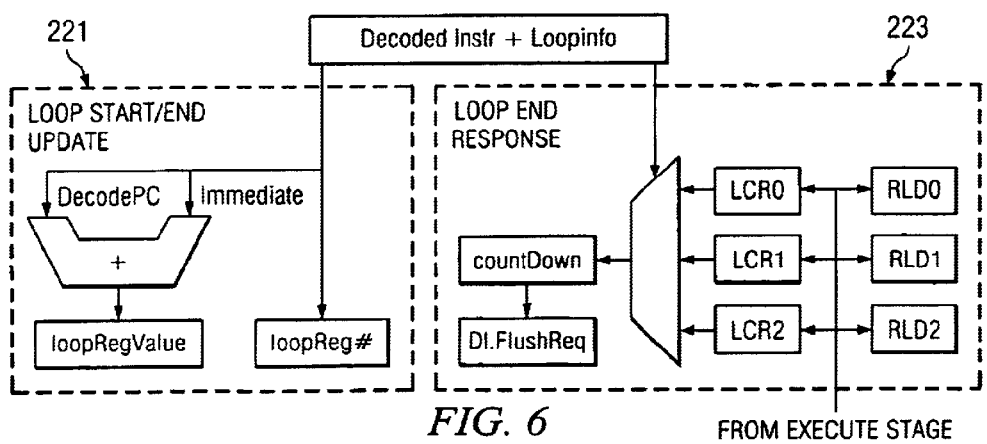
FIG. 6 is a more detailed block diagram of an exemplary loop start/end update circuit and a loop end response circuit according to one embodiment of the present invention.

FIG. 6 is a more detailed block diagram of exemplary loop start/end update circuitry 221 and loop end response circuitry 223 according to one embodiment of the present invention. Loop start/end update circuitry 221 and loop end response circuitry 223 reside in dispatch stage 204. Loop start/end update circuitry 221 computes the new loop register value for instructions that load loop registers using the Immediate field. Loop start/end update circuitry 221 also stores the loop register number for the register that is updated. This information is sent to the loop registers resident in fetch stage 202 to perform the update. In addition, loop sizer circuitry 216 uses this information to compute the new loop size. The architecture allows only one outstanding loop register to be updated. A scoreboard is maintained to facilitate this in decode stage 203.

Loop end response circuitry 223 examines the LoopInfo value to determine if the end of a loop is reached. If so, Loop end response circuitry 223 counts down the corresponding loop counter and initiates a flush to the instruction after the loop end in case the count is zero. Also, loop end response circuitry 223 generates a flush signal when a loop hit is detected on the start address and when the loop counter is initialized to zero. Loop end response circuitry 223 maintains the running count of the loop counters. In the event the loop counter reaches zero, the loop counters are reloaded from the reload registers RLD0, RLD1, RLD2. In such a case, loop sizer circuitry 216 in fetch stage 202 is activated to recompute the loop size again.

Although the present invention has been described in detail, those skilled in the art should understand that they can make various changes, substitutions and alterations herein without departing from the spirit and scope of the invention in its broadest form.

What is claimed is:

1. For use in a digital signal processor comprising an instruction fetch stage, a decode stage, a dispatch stage, and an execute stage, an apparatus for dynamically sizing a hardware loop capable of executing a plurality of instruction sequences forming a plurality of instruction loops comprising:

N pairs of loop start registers and loop end registers, each loop start register capable of storing a loop start address and each loop end register capable of storing a loop end address;

N comparators, each of said N comparators associated with one of said N pairs of loop start registers and loop end registers, wherein each of said N comparators is capable of comparing a selected one of a first loop start address and a first loop end address to a fetch program counter value to detect one of a loop start hit and a loop end hit; and fetch address generation circuitry capable of detecting said loop start hit and said loop end hit and fetching from an address in a program memory an instruction associated with one of said loop start hit and said loop end hit and loading said fetched instruction into said hardware loop.

2. The apparatus for dynamically sizing a hardware loop as set forth in claim 1 wherein said N pairs of loop start registers and loop end registers comprise three pairs of loop start registers and loop end registers.

3. The apparatus for dynamically sizing a hardware loop as set forth in claim 2 wherein said three pairs of loop start registers and loop end registers comprise a first loop start register and a first loop end register associated with a first instruction loop, a second loop start register and a second loop end register associated with a second instruction loop, and a third loop start register and a third loop end register associated with a third instruction loop.

4. The apparatus for dynamically sizing a hardware loop as set forth in claim 3 further comprising a loop buffer having a loop buffer size M capable of storing M instructions.

5. The-apparatus for dynamically sizing a hardware loop as set forth in claim 4 further comprising a loop buffer comparator capable of comparing said loop buffer size M to a difference between a first loop start address and a first loop end address to determine if a selected instruction loop associated with said first loop start address and said first loop end address is capable of fitting in said loop buffer.

6. The apparatus for dynamically sizing a hardware loop as set forth in claim 5 wherein said loop buffer comparator performs said comparison whenever one of said loop start registers and said loop end registers is updated.

7. A digital signal processor comprising:
an instruction fetch stage;
a decode stage;
a dispatch stage;
an execution stage; and
an apparatus for dynamically sizing a hardware loop capable of executing a plurality of instruction sequences forming a plurality of instruction loops comprising:

N pairs of loop start registers and loop end registers, each loop start register capable of storing a loop start address and each loop end register capable of storing a loop end address;

N comparators, each of said N comparators associated with one of said N pairs of loop start registers and loop end registers, wherein each of said N comparators is capable of comparing a selected one of a first loop start address and a first loop end address to a fetch program counter value to detect one of a loop start hit and a loop end hit; and fetch address generation circuitry capable of detecting said loop start hit and said loop end hit and fetching from an address in a program memory an instruction associated with one of said loop start hit and said loop end hit and loading said fetched instruction into said hardware loop.

8. The digital signal processor as set forth in claim 7 wherein said N pairs of loop start registers and loop end registers comprise three pairs of loop start registers and loop end registers.

9. The digital signal processor as set forth in claim 8 wherein said three pairs of loop start registers and loop end registers comprise a first loop start register and a first loop end register associated with a first instruction loop, a second loop start register and a second loop end register associated with a second instruction loop, and a third loop start register and a third loop end register associated with a third instruction loop.

10. The digital signal processor as set forth in claim 9 further comprising a loop buffer having a loop buffer size M capable of storing M instructions.

11. The digital signal processor as set forth in claim 10 further comprising a loop buffer comparator capable of comparing said loop buffer size M to a difference between a first loop start address and a first loop end address to determine if a selected instruction loop associated with said first loop start address and said first loop end address is capable of fitting in said loop buffer.

12. The digital signal processor as set forth in claim 11 wherein said loop buffer comparator performs said comparison whenever one of said loop start registers and said loop end registers is updated.

13. A wireless communication device comprising:
a radio frequency(RF) transceiver capable of receiving an incoming RF signal and down-converting said incoming RF signal to an incoming intermediate frequency (IF) signal;

analog processing circuitry capable of receiving said incoming IF signal and down-converting said incoming IF signal to an incoming digital data stream; and a digital signal processor capable of receiving said incoming digital data stream and generating therefrom an analog baseband signal, said digital signal processor comprising:

an apparatus for dynamically sizing a hardware loop capable of executing a plurality of instruction sequences forming a plurality of instruction loops comprising:

N pairs of loop start registers and loop end registers, each loop start register capable of storing a loop start address and each loop end register capable of storing a loop end address;

N comparators, each of said N comparators associated with one of said N pairs of loop start registers and loop end registers, wherein each of said N comparators is capable of comparing a selected one of a first loop start address and a first loop end address to a fetch program counter value to detect one of a loop start hit and a loop end hit; and fetch address generation circuitry capable of detecting said loop start hit and said loop end hit and fetching from an address in a program memory an instruction associated with one of said loop start hit and said loop end hit and loading said fetched instruction into said hardware loop.

14. The wireless communication device as set forth in claim 13 wherein said N pairs of loop start registers and loop end registers comprise three pairs of loop start registers and loop end registers.

15. The wireless communication device as set forth in claim 14 wherein said three pairs of loop start registers and loop end registers comprise a first loop start register and a first loop end register associated with a first instruction loop, a second loop start register and a second loop end register associated with a second instruction loop, and a third loop start register and a third loop end register associated with a third instruction loop.

16. The wireless communication device as set forth in claim 15 further comprising a loop buffer having a loop buffer size M capable of storing M instructions.

17. The wireless communication device as set forth in claim 16 further comprising a loop buffer comparator capable of comparing said loop buffer size M to a difference between a first loop start address and a first loop end address to determine if a selected instruction loop associated with said first loop start address and said first loop end address is capable of fitting in said loop buffer.

18. The wireless communication device as set forth in claim 17 wherein said loop buffer comparator performs said comparison whenever one of said loop start registers and said loop end registers is updated.

19. For use in a digital signal processor comprising an instruction fetch stage, a decode stage, a dispatch stage and an execute stage, a method of dynamically sizing a hardware loop capable of executing a plurality of instruction sequences forming a plurality of instruction loops comprising the steps of:

storing a loop start address and a loop end address in each of N pairs of loop start registers and loop end registers;

comparing in each of N comparators a selected one of a first loop start address and a first loop end address to a fetch program counter value to detect one of a loop start hit and a loop end hit, wherein the each of the N comparators is associated with one of the N pairs of loop start registers and loop end registers;

in response to detection of one of said loop start hit and said loop end hit, fetching from an address in a program memory an instruction associated with one of the loop start hit and the loop end hit; and loading the fetched instruction into the hardware loop.

20. The method as set forth in claim 19 wherein the N pairs of loop start registers and loop end registers comprise three pairs of loop start registers and loop end registers.

21. The method as set forth in claim 20 wherein the three pairs of loop start registers and loop end registers comprise a first loop start-register and a first loop end register associated with a first instruction loop, a second loop start register and a second loop end register associated with a second instruction loop, and a third loop start register and a third loop end register associated with a third instruction loop.

* * * * *